United States Patent [19]

Kozlik et al.

[11] Patent Number: 4,680,581
[45] Date of Patent: Jul. 14, 1987

[54] LOCAL AREA NETWORK SPECIAL FUNCTION FRAMES

[75] Inventors: Tony J. Kozlik; Bruce J. Landini, both of Phoenix, Ariz.

[73] Assignee: Honeywell Inc., Phoenix, Ariz.

[21] Appl. No.: 716,912

[22] Filed: Mar. 28, 1985

[51] Int. Cl.[4] .................. H04Q 9/00; G05B 23/02; H04J 6/00
[52] U.S. Cl. ................... 340/825.06; 370/85; 371/22; 340/825.5
[58] Field of Search .......... 340/825.06, 825.05, 340/825.5; 370/85, 86, 13; 371/25, 26, 55, 22; 179/175.2 C

[56] References Cited

U.S. PATENT DOCUMENTS

| | | | |
|---|---|---|---|
| 4,506,360 | 3/1985 | Kryskow, Jr. et al. | 370/85 |
| 4,536,874 | 8/1985 | Stoffel et al. | 340/825.5 |
| 4,575,847 | 3/1986 | Fallwell, Jr. et al. | 340/825.5 |
| 4,590,468 | 5/1986 | Stieglitz | 340/825.5 |

*Primary Examiner*—Donald J. Yusko
*Attorney, Agent, or Firm*—A. A. Sapelli; A. Medved

[57] ABSTRACT

In a local area network having a plurality of nodes, wherein the local area network utilizes a token passing scheme for communicating between nodes, each node has an interface apparatus which operates independently of a processor associated with the node. The node can be in an on-line mode or an off-line mode, wherein the node does not participate in token passing or receive information when in the off-line mode. A method of the present invention provides for diagnosing and/or recovering a second node from a first node, the method implemented by the second node includes the steps of waiting to receive a message frame addressed to the second node. If the message frame addressed to the second node is a special function frame, and if the second node is in the off-line mode, the type of special function frame is determined to perform the command specified by the type of special function frame. The operation of the second node then returns to the step of waiting to receive a message frame addressed to it.

5 Claims, 11 Drawing Figures

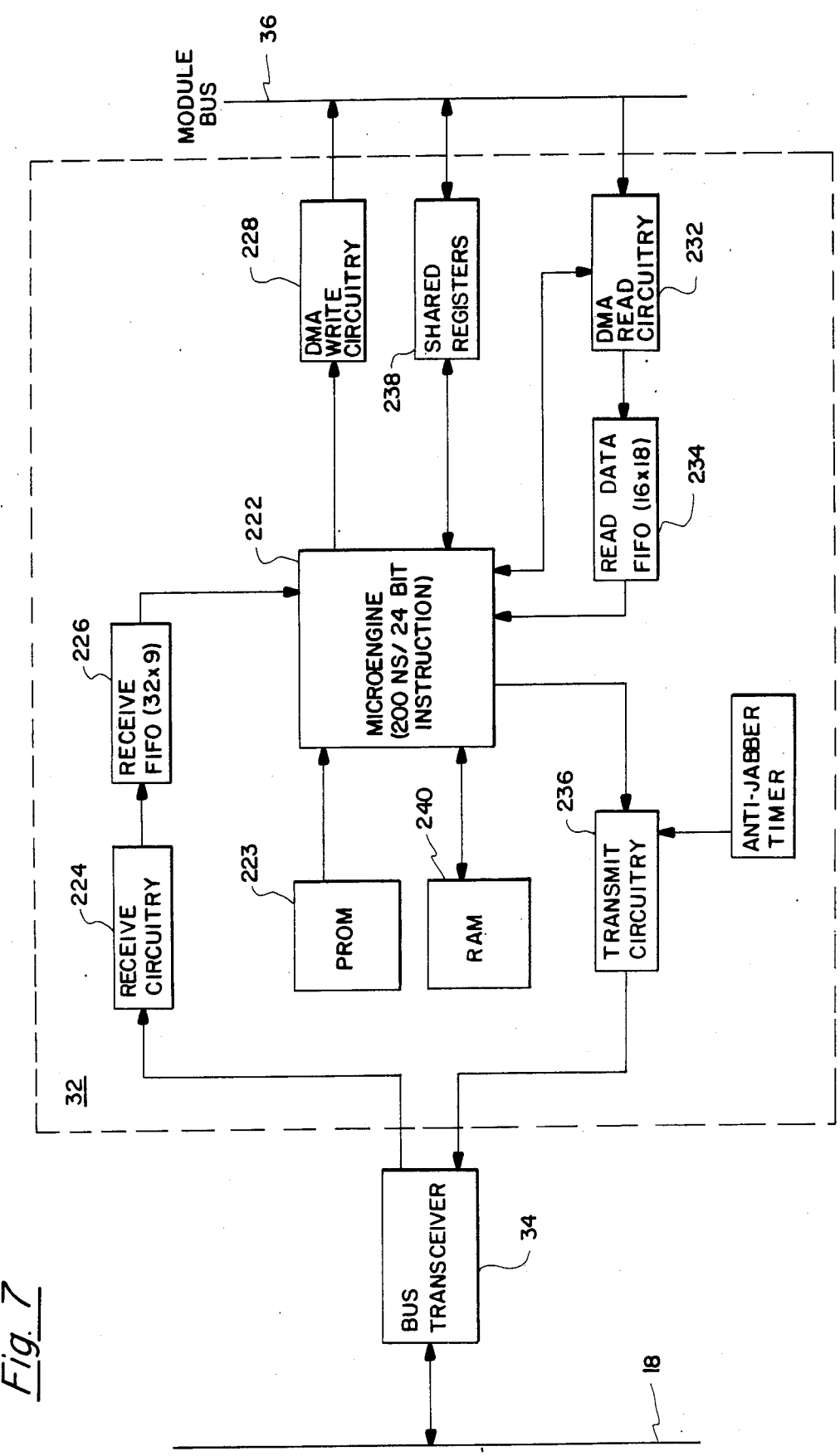

LOCAL AREA NETWORK SPECIAL FUNCTION FRAMES

RELATED PATENT APPLICATION

This invention may be employed in a distributed data processing system as disclosed in U.S. patent application, Ser. No. 540,061 and filed Oct. 7, 1983 entitled "Plant Management System", by R. A. Henzel, now U.S. Pat. No. 4,607,325, the related patent application being assigned to the same assignee as the present application.

BACKGROUND OF THE INVENTION

There exists many types of local area networks (LAN) which are in use, or are under developement, or in the process of being standardized. Generally, in a LAN, there exists a bus and a plurality of stations (or nodes) attached to the bus. Each station (or node) attached to the bus has the same status as any other station, i.e., there is no master and slave relationship between the stations. Thus, no features of an LAN are known to exist whereby a predetermined station can interrogate any other station and further where an interrogation/replay between stations results in a diagnostic and recovery type function.

The present invention allows a node (or remote node) on a local area network to be diagnosed and manipulated from a predetermined node that has an operator interface (or has an interface which permits I/O, or interaction with an entity (i.e., an operator) outside the local area network). The predetermined node (denoted herein as a supervisor node) having the operator interface can therefore control/diagnose/receive status reports of any of the remote nodes. An interface apparatus is provided at each node of the local area network which permits communication to the predetermined node (or supervisor node) independent of the remote node host microprocessor.

SUMMARY OF THE INVENTION

Therefore, there is supplied by the present invention, an interface apparatus for providing each node of the local area network the capability of communicating with a supervisor node in accordance with the method of the present invention, independent of the status of the associated node microprocessor. In a local area network having a plurality of nodes, wherein the local area network utilizes a token passing scheme for communicating between nodes, each node having an interface apparatus which operates independently of a processor associated with the node, a method of diagnosing and/or recovering a second node from a first node, the method implemented by the second node comprising the steps of waiting to receive a message frame addressed to the second node. The second node then determines if the message frame is a special function frame. If the message frame is determined to be a special function frame, the second node insures that the node is in an off-line mode. The second mode then determines the type of special function frame to perform the command specified by the type of special function frame. Finally, the second node operation returns to the step of waiting to receive a message frame addressed to the second node.

Accordingly, it is an object of the present invention to provide an apparatus for communicating with a predetermined node of a local area network.

It is another object of the present invention to provide an apparatus for communicating with a predetermined node of a local area network in response to a request for predetermined information.

It is still another object of the present invention to provide an apparatus for communicating with a predetermined node of a local area network in response to a request for predetermined information independent of the status of a processor unit associated with the node.

These and other objects of the present invention will become more apparent taken in conjunction with the following description and attached drawings, wherein like characters indicate like parts, and which drawings form a part of the present application.

BRIEF DESCRIPTION OF THE DRAWINGS

FIG. 7 shows a logic block diagram of each bus interface unit of the local area network;

FIG. 10, shows a flow diagram of the operation of the bus interface unit.

DETAILED DESCRIPTION

Figure 1:
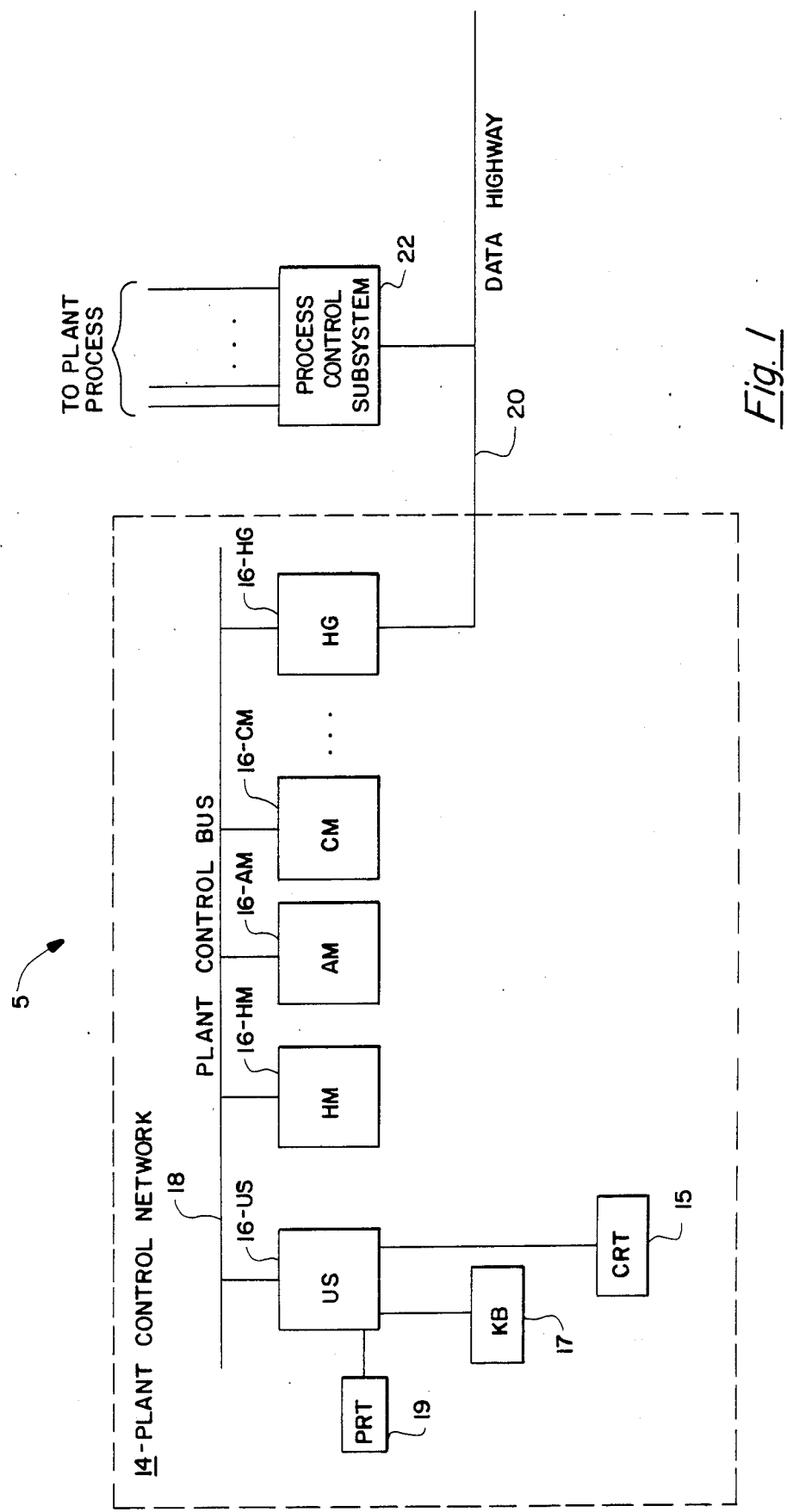
FIG. 1 shows a system block diagram of a control system in which the apparatus of the present invention may be included.

Before describing the apparatus of the present invention, it will be helpful to describe a local area network (LAN) in which the apparatus of the present invention can be utilized. Referring to FIG. 1, there is shown a system block diagram of a control system 5, or more simply a system 5. The organization, or architecture, of the control system 5 includes a plant control network (or more simply network) 14, a token passing distributed local area network (LAN). Physical modules 16 of network 14 are of various specialized functional types, as will be described hereinunder. Each physical module 16 is the peer, or equivalent, of the other in terms of right of access to the network's communication medium, or plant control bus 18, for the purpose of transmitting data to other modules 16 of network 14. Highway gateway module 16-HG provides communications and data translation facilities between plant control bus 18 and data highway 20 associated with a process control subsystem 22, which is a distributed digital process control and data acquisition subsystem.

The process control subsystem 22 is, in the preferred embodiment, a Honeywell Inc. TDC 2000 process control system, a description of which is found in a Honeywell publication entitled, "Basic Systems TDC 2000 System Summary SY-02-02", dated June 1981, 12 pages.

Universal operator station module (US) 16-US of network 14 is a work station for one or more plant operators. It includes an operator console which is the interface between the plant operator, or operators, and the process or processes of the plant for which they are responsible. Each universal operator station module 16-US, is connected to plant control bus 18, and all communications between the universal operator station module 16-US, and any other module 16 of network 14, is by means of plant control bus 18. Universal operator station module 16-US has access to data that is on plant control bus 18 and the resources and data available through, or from, any of the other modules 16 of network 14. The universal station module 16-US includes a cathode ray tube display (CRT) 15 which includes a video display generator, an operator keyboard (KB) 17, a printer (PRT) 19, and can also include (but not shown) a floppy disk data storage device, trend pen recorders, and status displays, for example.

A history module (HM) 16-HM provides mass data storage capability. The history module 16-HM includes at least one conventional disk mass storage device such as a Winchester disk, which disk storage device provides a large volume of nonvolatile storage capability for binary data. The types of data stored by such a mass storage device are typically trend histories, or data from which such trends can be determined, data that constitutes or forms CRT type displays, copies of programs for modules 16, . . . . In the preferred embodiment, a disk data storage unit of the history module such as 16-HM can store up to 32.5 megabytes of data.

An application module (AM) 16-AM provides additional data processing capability in support of the process control functions performed by the controllers associated with the process control subsystem, such as data acquisition, alarming, batch history collection, and provide continuous control computational facilities when needed. The data processing capability of the application module 16-AM is provided by a processor (not shown) and a memory (not shown) associated with the module.

Computer module (CM) 16-CM uses the standard or common units of all physical modules 16 to permit a medium-to-large scale, general purpose data processing system to communicate with other modules 16 of network 14 and the units of such modules over plant control bus 18 and the units of process control subsystems 22 via the highway gateway module 16-HG. Data processing systems of a computer module 16-CM are used to provide supervisory, optimization, generalized user program preparation and execution of such programs in higher level program languages. Typically, the data processing systems of a computer module 16-CM have the capability of communicating with other such systems by a communication processor and communication lines.

Plant control bus 18 (or more simply bus 18) is a high-speed, but serial dual redundant communication bus that interconnects all the modules 16 of plant control network 14. Bus 18 provides the only data transfer path between the principal sources of data, such as highway gateway module 16-HG, application module 16-AM, and history module 16-HM, and principal users of such data, such as universal operator station module 16-US, computer module 16-CM, and application module 16-AM. Bus 18 also provides the communication medium over which large blocks of data, such as memory images, can be moved from one module 16, such as history module 16-HM to universal station module 16-US. Bus 18 is dual redundant in that it consists of two coaxial cables that permit the serial transmission of binary signals over both at a rate of five megabits per second.

Figure 2:
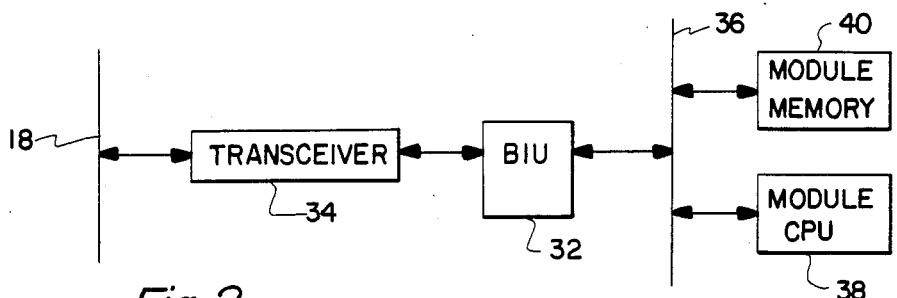
FIG. 2 shows a schematic block diagram illustrating the common elements of each physical module of the plant control network of the system.

Each of the physical modules 16 includes certain, or required, standard units, which are illustrated in FIG. 2. Each module 16 has a bus interface unit, BIU, 32 which is connected to the plant control bus 18 by a transceiver 34. Each module 16 is also provided with a module bus 36 which, in the preferred embodiment, is capable of transmitting 16 bits of data in parallel, a module CPU 38 and a module memory 40. Other units, units to tailor each type of module 16 to satisfy its functional requirements, are operatively connected to module bus 36 so that each such unit can communicate with the other units of a module 16 via its module bus 36. The BIU 32 of the module 16 that has the token at any given time is enabled to transmit data on, or over, bus 18. In the preferred embodiment, all transmissions by a BIU 32 are transmitted over the coaxial cables which form the bus 18. A more detailed description of the control system 5 can be had by referring to the above-related U.S. patent application, Ser. No. 540,061 and filed Oct. 7, 1983, entitled "Plant Management System".

Figure 3:
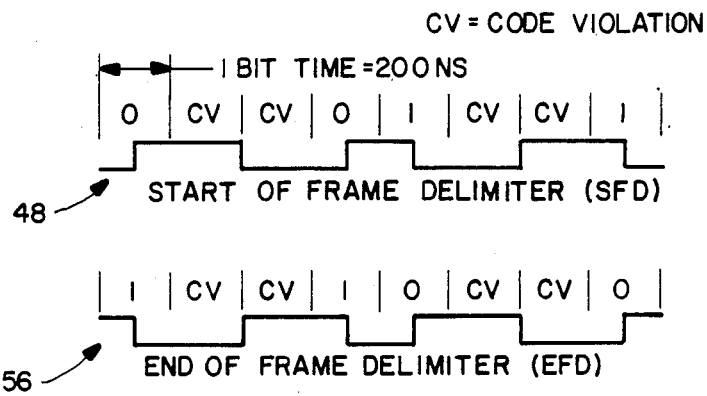
FIG. 3 illustrates the wave forms of start-of-frame and end-of frame delimiters.
Figure 4:
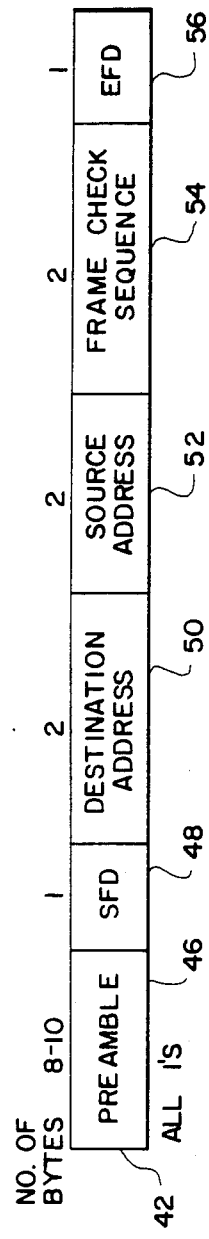
FIG. 4 shows the format of a token-passing frame.

Information is transmitted between modules of network 14 by frames of two types one of which is a token-passing frame, or token, 42, such as is illustrated in FIG. 4. A token-pass frame 42 includes from 8 to 10 bytes of a preamble 46. Preamble 46 consists of signals of the same type, such as logical ones. Preamble 46 is followed by a start-of-frame delimiter, SFD 48, of one byte, destination address field 50 of two bytes, a source address field 52 of two bytes, a frame check sequence 54 of two bytes, which sequence is used to detect errors in frame 42, and an end-of-frame delimiter, EFD 56, of one byte. In FIG. 3, the wave forms of start-of-frame delimiter, SFD 48, and of end-of-frame delimiter 56, EFD, are illustrated.

Information transmitted by a transmit circuit of the BIU 32 of the module 16 having the token over bus 18 consists of binary signals which are manchester encoded so that a receive clock can be derived from the received signals by each receiving BIU 32. A logical 0 is transmitted by the signal during the first half of a bit being low and being high during the second half of the bit, a mid-bit low-to-high transition. A logical 1 is transmitted by the signal during the first half of the bit being high and low during the second half, a mid-bit high-to-low transition. Manchester encoding requires that there always be a transition in the middle of each bit cell. If there is no such transition, a code violation (CV) occurs. Both start and end-of-frame delimiters 48, 56 include code violations, four CV's for each. By using CV's in this manner, a 4-bit error would have to occur to change valid data into a frame delimiter. End-of-frame delimiter 56 is used rather than silence on bus 18 because of the possibility of reflections on bus 18 being interpreted as a transmission after transmission is stopped by the module 16 having the token at any given time. An antijabber timer of each BIU 32 inhibits the continuous transmission of signals by a BIU 32 for more than a predetermined period of time, which period is substantially longer than is required to transmit the largest information frame 44. The timer is reset each time a BIU 32 stops transmitting.

Figure 5:
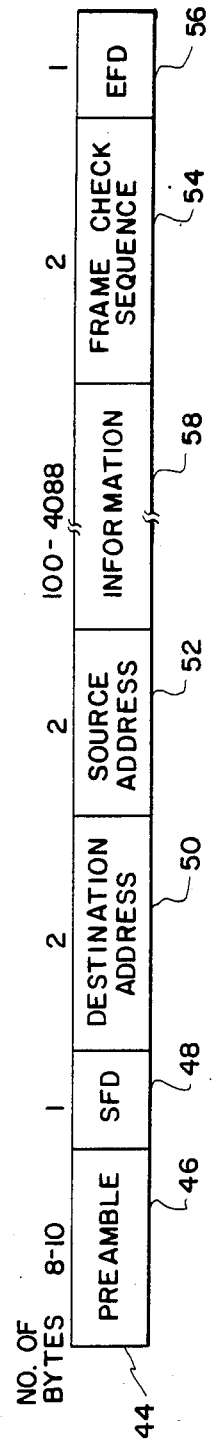
FIG. 5 shows the format of an information frame.

Referring still to FIGS. 4 and 5, it can be seen that the format of an information frame 44 differs from that of a token-pass frame 42 only by including an information field 58. In the preferred embodiment, field 58 is limited to include between 100 and 4,088 bytes of binary data. All other fields of an information frame 44 are the same as that of token-pass frame 42.

Figure 6:
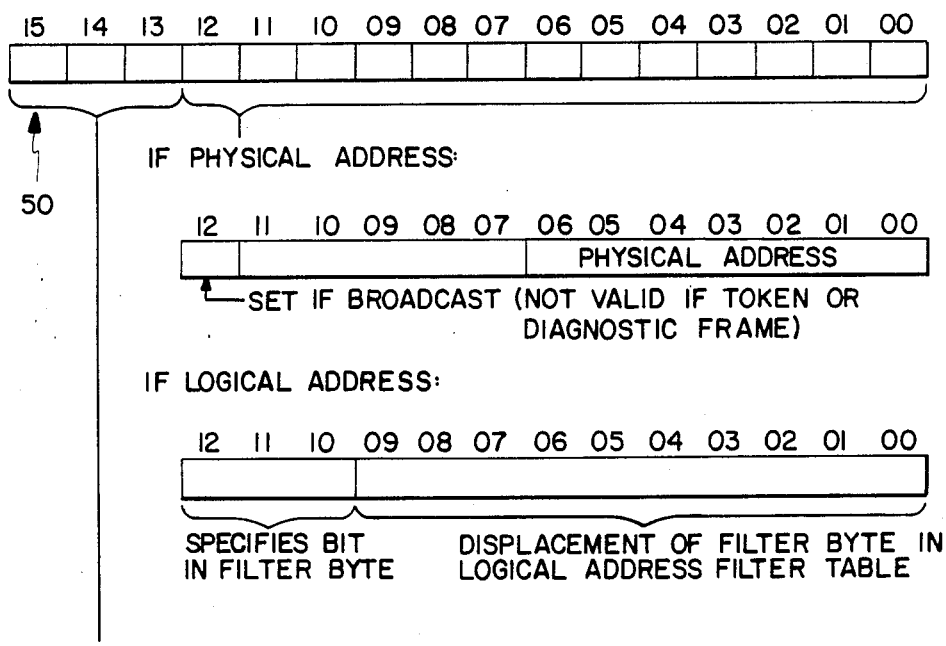
FIG. 6 defines the significance of various bit configurations of a destination address filed of a frame.

In FIG. 6, the significance of the bit positions of a destination address field 50 of a frame is explained. A frame, either a token-pass frame 42 or an information frame 44, is defined as a packet of a message formatted for transmission over plant control bus 18. In the preferred embodiment, there are two basic types of addresses: a physical address and a logical address. A physical address is the address of a given physical module 16, and field 50 is identified or decoded as being that of a physical module 16 when the most significant bit, bit position 15 of field 50, is a logical zero. Each module 16 has a unique 7-bit physical address. Typically, the physical address of a physical module 16 is determined by a multi-bit switch or by a series of mechanically-made circuit interconnections, or the like, mounted, in the preferred embodiment, on the printed circuit board of the module containing one of its transceivers 34. A token-pass frame 42 is identified by the three most significant bit positions, bits 15, 14, and 13 being logical zeros. The lower order seven-bit positions, bit positions 06-00, are the physical address of the physical module 16 to which a token 42, for example, is addressed. If bit positions 15 and 14 are logical zeros and bit position 13 is a logical one, then the frame is a diagnostic frame addressed to the module 16 whose physical address corresponds to that of, or equals that defined by, the bits in the lower order seven bit positions of field 50. A special function frame is a form of an information frame 44 and can be used to determine if a given problem or set of problems exist in the addressed module. If bits 15 and 14 are logical ones, then bit 13 designates which of the two receive channels of the addressed module's BIU 32 is to accept and process the frame. If bit 12 is set and the address is a physical address but not a token or a diagnostic frame, the frame is to be received, or is addressed to all physical modules 16 of network 14.

A logical one in bit position 15 indicates that the address defined by the bits of the lower order bit positions, 12 through 00, is that of a logical entity or logical module where a logical entity or module is a program module or set of data. If bit 14 is a zero under such circumstances, then bit 13 designates which receive channel of the addressed BIU is to receive, or process, the frame. If bits 15 and 14 are both logical ones, then the frame is an interrupt, a high-priority message, and bit 13 designates the receive channel of the BIU 32 to receive the interrupt.

A module's BIU 32 determines which logically addressed frames transmitted over bus 18 are addressed to it. In the preferred embodiment, there can be up to 8K different logical addresses where $K=2^{10}$. A BIU 32 determines if it is to accept an information frame with a logical address by means of a logical address filter table. The lower order 10 bits of the address field are the address of bytes of data, a filter byte, which is stored at each addressable location in the filter memory of each BIU 32. The higher order 3 bits of the logical address, bit positions 12-10, specify a bit position of the addressed filter word. If that bit is a logical one, then that frame is accepted by the module since it is addressed to a logical module or program stored in that module's memory 40.

In the preferred embodiment, modules 16 have been provided with redundant or backup modules, but have been omitted in order to simplify the drawings and description.

Each type of module 16 is comprised of hardware devices which are physically packaged together and designed to support a particular set of functions. The unit of redundancy in the network 14 is the physical module 16. A redundant, secondary, or backup, module 16 must be of the same type as its primary module so that both will have the same complement of hardware units. It will be understood by those skilled in the art that each type of module 16 of the network 14 is capable of having one or more backups.

Each of modules 16 includes a module central processor unit 38 and a module memory 40, a random-access memory, and such additional controller devices, or units, which are configured to provide the desired functionality of that type of module; i.e., that of the operator station 16-US, for example. The data-processing capabilities of each module's CPU 38 and module memory 40 create a distributed processing environment which provides for improved reliability and performance of network 14 and plant management system 5. The reliability of network 14 and plant management system 5 is improved because, if one module 16 of network 14 fails, the other modules 16 will remain operational. As a result, network 14 as a whole is not disabled by such an occurrence as would be the case in centralized systems. Performance is improved by this distributed environment in that throughput and fast operator response times result from the increased computer processing resources, and the concurrency and parallelism of the data-processing capabilities of the system.

Each module 16 is responsible for the integrity of its own operation. The failure of a module 16 is detected by the module itself and, if it does detect such a failure, it will cease operation and send a terminating state, or status, message if possible. Under certain circumstances, a module's bus interface unit 32 will send out a failed status message if its watchdog timer times out, for example. If a module, as a whole, is unable to send out a failed state or status message, its backup module (not shown) will detect the failure of its primary because of the absence of periodic status messages which are transmitted by a primary module to its backup modules. A backup, or secondary, module 16, upon receipt of a terminating or failed status message, or, upon the absence of the receipt of its associated primary module's status message, starts operating as a primary module. The functions performed by each physical module are controlled by its programming, and each program entity, or program module, is assigned a logical address which is sometimes referred to as a logical module. The redundant, or backup, physical modules will contain the same set of logical functions or logical modules as their primary. It should be noted that the backup modules for a primary physical module of one type must be of the same type as its primary.

Modules 16 communicate with each other over the communication medium, or bus 18. As mentioned above, in network 14, each of the modules 16 is the equivalent, or the peer, of the others. Thus, in network 14 no one of the modules 16 is a master module, and each of the modules 16 has an equal right of access for the purpose of transmitting information over bus 18. It should be noted that all modules 16 receive all signals transmitted over bus 18 by any of the other modules. Each module 16 is assigned a physical address with the smallest physical address of a module 16 being 00 and the largest being $2^n$. In the preferred embodiment, n=7, so that the maximum number of modules comprising network 14 is 128. While all the modules of network 14 are physically connected to bus 18 so as to both receive and transmit binary data, a logical ring is formed in which each module 16 transmits the token 42 to its successor, the next module 16 in the logical ring having a larger physical address.

A successor module 16 recognizes that it is the successor, or accepts a token addressed to it by its predecessor module by transmitting within a predetermined period of time after receiving a token addressed to it, and by doing so has the token or accepts it. Accepting a token addressed to it confers on the accepting module 16, the right to transmit information over bus 18 to other modules 16. Accepting a token requires the accepting module 16 to which the token is addressed to recognize the signals constituting a token as being such, and that the token is addressed to it. The receipt of such a token by a successor module 16 from its predecessor transfers the right to the successor to transmit within a predetermined period of time an information frame over bus 18 to any or all of the modules 16 connected thereto, as well as the necessity for transmitting the token 42 to its successor. As stated above, a successor module 16 is the module having the next larger physical address than the module having the token at any given time. In any such logical ring, the next larger address after $2^7$ or 127 is defined as being logical address 00. It should be noted that, while the maximum number of modules in a logical ring is 128, the minimum number is 2. Each of the modules 16 has a given function, such as being an operator station, a mass-memory storage subsystem, a data processing subsystem, or an access controller which permits other devices including other local-area networks to communicate with network 14, etc.

Referring to FIG. 7, there is shown a partial functional block diagram of a representation module 16, which includes the bus interface unit (BIU) 32 and a transceiver 34 which connect BIU 32 to bus 18 and is capable of transmitting data over bus 18 and of receiving data from bus 18. Transceiver 34, in the preferred embodiment, is transformer coupled to bus 18. BIU 32 is provided with a very fast microengine 222, one of the functions of which is to identify tokens 42 addressed to it or its module 16 and to transmit a token 42 to its successor module. In the preferred embodiment, microengine 222 is an 8-bit-wide arithmetic and logic unit made of bit slice components. Microengine 222 can execute a 24-bit microinstruction from its programmable read only memory (PROM) 223 in 200 nanoseconds. Microengine 222 also includes a crystal controlled clock which produces 5 megahertz (MHz) clock signals.

Data received from bus 18 by BIU 32, for example, is transmitted by bus transceiver 34 and receiver circuitry 224 to receive FIFO register 226, which, in the preferred embodiment, stores thirty-two eight-bit bytes of data plus one parity bit per byte. Microengine 222 examines the destination address fields of data information frames and token pass frames 42 received and stored in FIFO register 226 to determine if each frame received is addressed to it, and, if the frame addressed to it is an information frame 44 or a token frame 42. If the received data is an information frame 44, then the received data is transferred by direct memory access (DMA) write circuitry 228 by conventional direct memory access techniques to the module memory 40 over module bus 36 over which the module memory 40 and module CPU 38 directly communicate with BIU 32. Module bus 36, in the preferred embodiment, is capable of transmitting sixteen data bits plus two parity bits in parallel. (Module CPU 38 and module memory 40 are not illustrated here but are shown in FIG. 2.)

If a received frame is a token pass frame 42 addressed to BIU 32, i.e., the token's destination address field 50 contains the address of the BIU (denoted MY ADDRESS), microengine 222 is programmed to act without intervention of the module CPU 40. On receipt of a token pass frame 42, the destination address field 50 of the token, which is the physical address of module 16 and thus of BIU 32, BIU 32 will transmit an information frame, if one is available, to another module or to all of the modules 16 attached to the bus 18, which form a logical ring. In doing so, microengine 222 causes its DMA read circuitry 232 to transfer data comprising this information from the module memory 40 into its read data FIFO register 234. Microengine 222 causes data from register 234 to be transferred to transmit circuitry 236 eight bits at a time once every eight instruction cycles, or clock periods, of microengine 222. The rate at which data is either obtained from or written into the module memory 40 over module bus 36 by the DMA circuitry 228 or 232 is up to sixteen times greater than the rate at which the data is received from bus 18 by buffer receive register 226 or is transmitted by transmitter circuitry 236 and bus transceiver 34 to bus 18. To assure this is the case, each BIU 32 is assigned the highest priority with respect to direct memory access of the module memory 40.

Module CPU 38 issues commands to BIU 32 by writing the commands into shared registers 238. Microengine 222 processes such commands during interframe gaps or when a frame is being received that is not addressed to it. Shared registers 238 also contain status information that is readable by module CPU 38. BIU 32 is also provided with a random-access memory RAM 240, into which is stored the physical address of module 32 in the network 14, as MY ADDRESS. The source of the signals representing BIU 32's physical address in the preferred embodiment is a series of interconnections on the same circuit board as transceiver 34.

Figure 8:
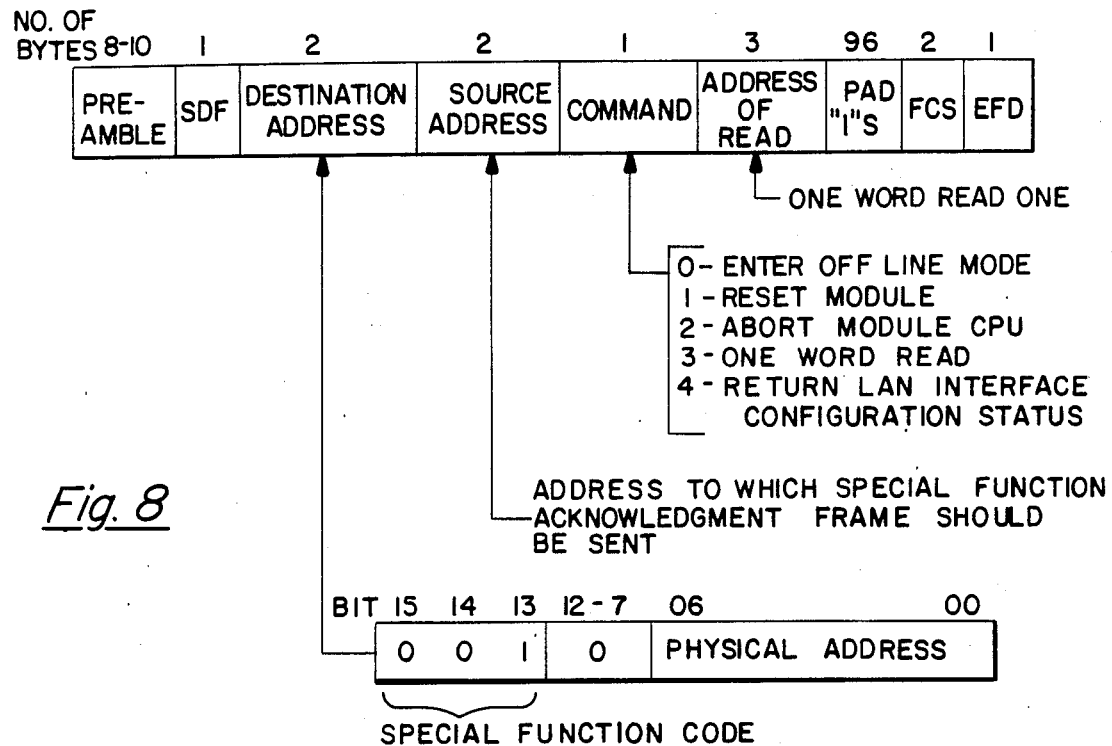
FIG. 8 shows the format of a special function frame.

Referring to FIG. 8, there is shown a format of a special function frame. The special function frame can be received by any module 16 of network 14 from any of modules 16, however, in the preferred embodiment of the present invention, it is received from a "supervisor" node, specifically the universal station 16-US. As discussed above, the microengine 222 can operate in both an off-line and an on-line mode. In the off-line mode, all commands from the module CPU 38 are processed except the start commands. Also, in the off-line mode, the module 16 does not participate in token passing or receive information frames. The module 16 will process special function frames is they are received. In the on-line mode the module 16 accepts all commands from the module CPU 38 and participates in token passing. The special function frames are not accepted or processed in an on-line mode except for the enter off-line mode frame.

Receipt of special function frames that cause the module 16 to enter the off-line mode, or if it is already in that mode, perform the function specified by the frame. Special function frames are sent using normal transmission mechanisms described above. When a module 16 enters the off-line mode, it disables the module CPU 38 watchdog function, it flags the module CPU 38 that it is in the off-line mode, and it executes the specific diagnostic functions. Special function frames can indicate the following functions:

a. Enter off-line mode
b. Resent module - performs a reset (hardware master clear) of the module 18
c. Abort module CPU 38 - the abort is accomplished by pulsing the power fail interrupt line (level 7) and setting appropriate status so that the module CPU 38 enters an externally induced error recovery routine. A module 16 sends a module CPU 38 watchdog time out frame to inform the network 14 that the module CPU 38 in this module has been aborted.
d. One word read - transmits back to the supervisor node the contents of one word of module memory 40 or I/O controller nonpaged status.
e. Return configuration status - transmits back to the supervisor node the module 16 configuration status of BIU 32 which includes a module CPU 38 and module memory 40 status bits (the module CPU of the preferred embodiment is a Motorola 68000).

Figure 9:
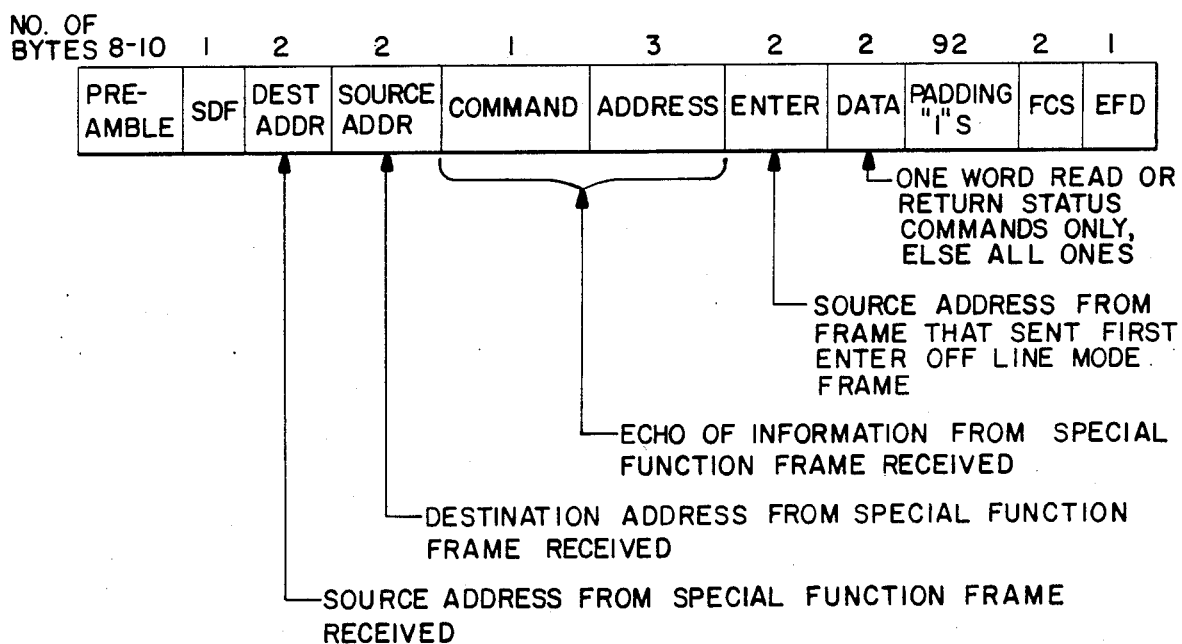
FIG. 9 shows the format of a special function acknowledgement frame.

The reset module special function frame does not have an acknowledgment. All other frames have an acknowledge frame returned, the format of the acknowledgment frame being shown in FIG. 9. In the event the module 16 receives a special function frame before it has finished processing a previous special function frame, only the first special function frame will be honored and have an acknowledgment frame sent.

Figure 10A:
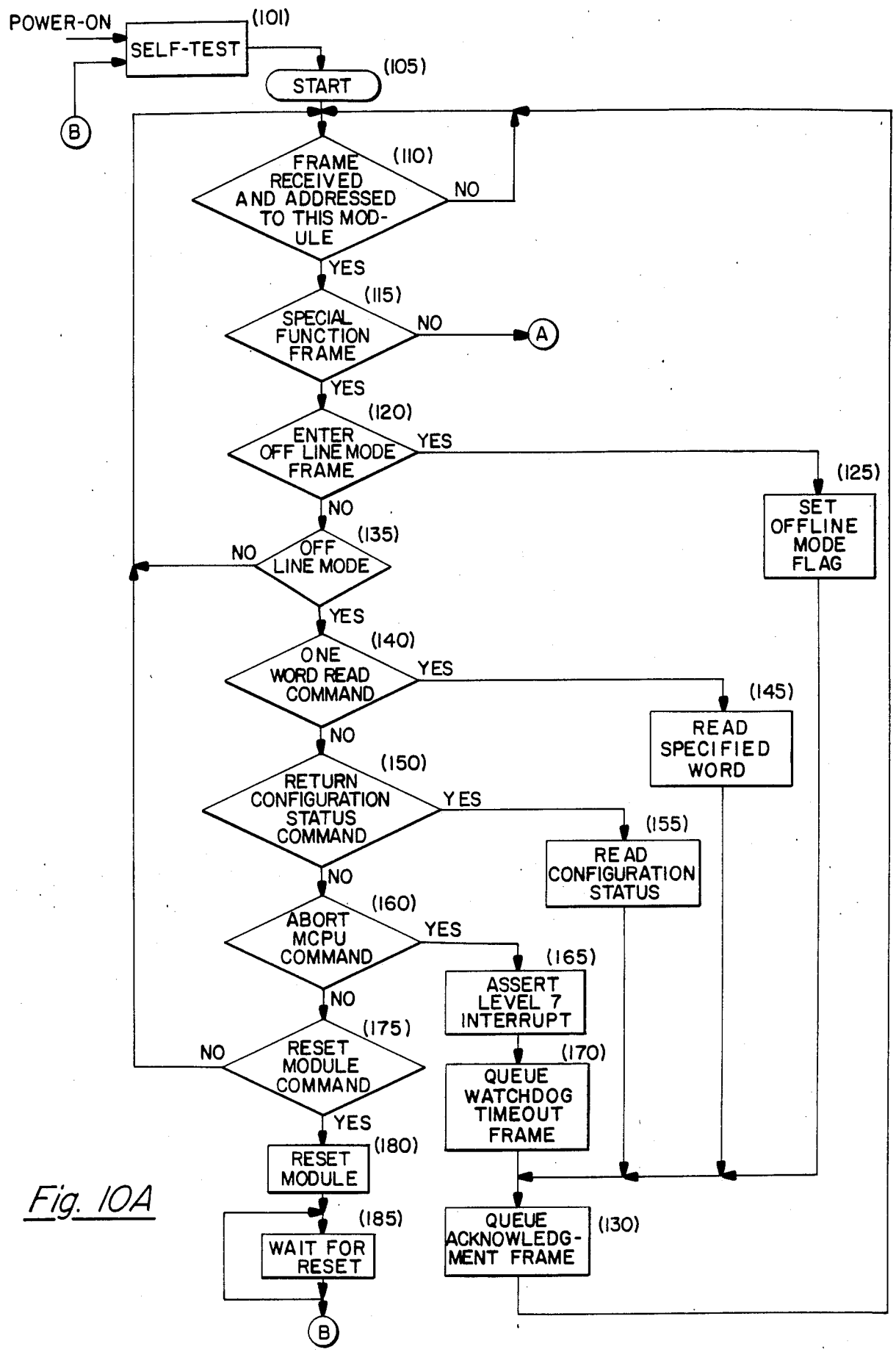
FIGS. 10A and 10B, which together comprise
Figure 10B:
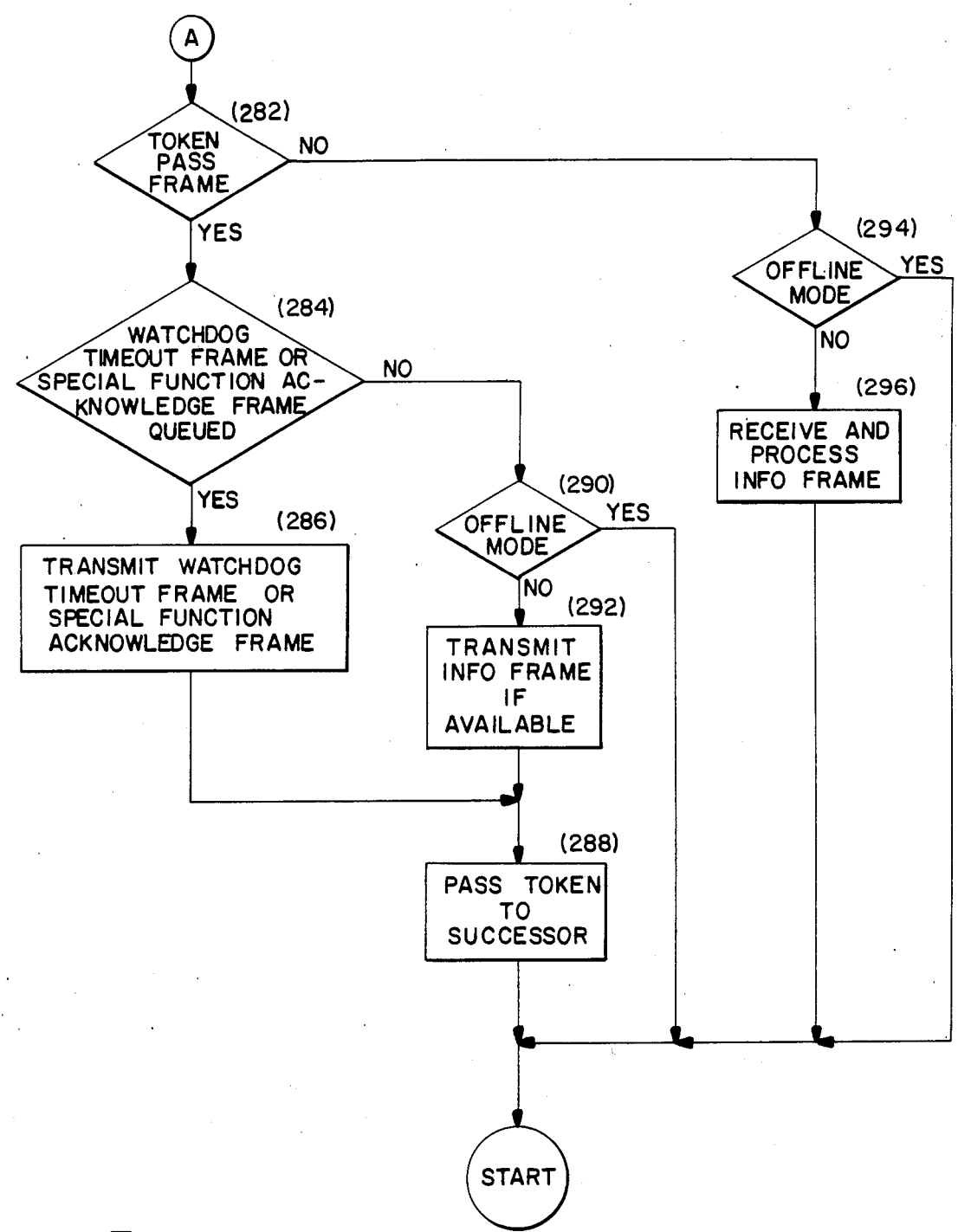

Referring to FIGS. 10A and 10B, which together comprise FIG. 10, there is shown a flow diagram of the operation performed by the BIU 32, and more specifically the microengine 222 of BIU 32.

The microengine 222 of each module 16, performs a self test (block 101) when the module 16 is initially powered on to verify that the module 16 is operating properly, and starts its interfacing operation at the conclusion of self test at START (block 105). Each BIU 32 of each module 16 receives every frame transmitted on bus 18, and determines if the frame is addressed to it (block 110). If the frame is not addressed to that module, the module 16 is essentially in a wait loop waiting for a frame addressed to the module 16. If the frame received is addressed to the module a check is initiated to determine if the frame is a special function frame (block 115). If the frame is determined to be a special function frame a check is then performed to determine if the frame is a command to enter the off line mode (block 120). If the command is to enter the off line mode, the off line mode flag is set (block 125), a special function acknowledgment frame (or more simply referred to herein as an acknowledgment frame) is queued (block 130), and the operation returns to the wait loop of block 110.

At block 120, if the command was not to enter the off line mode, a check is performed to determine if the off line mode has already been established (block 135). If the off line mode has not been established, the operation returns to the wait loop of block 110 since special function frame processing can be performed only in an off line mode. If the off line mode has been established the commands are decoded to determine the type of the command, i.e., if a one word read command has been received (block 140). If a one word read command has been received, the word specified is read (block 145), an acknowledgment frame is queued up (block 130) for subsequent transmission when the module 16 receives the token, the acknowledgment frame including the contents of the word specified to be read, and the operation returns to the wait loop of block 110.

At block 140 if the command was not a one word read command, the command is decoded to determine if a return configuration status was received (block 150). If the command is determined to be a return configuration status command, the configuration status is read (block 155), the acknowledgment frame is queued up (block 130), and the operation returns to the wait loop of block 110. If the command was not a return configuration status command (block 150), a determination is made to determine if the command is an abort MCPU command (block 160). If the command is to abort the MCPU 38, a level 7 interrupt is issued (block 165), a watchdog time out frame is queued up (block 170), an acknowledgment frame is queued (block 130), and the operation returns to the wait loop of block 110. (The level 7 interrupt is the power fail interrupt of the Motorola 68000 which aborts the current processing of the module CPU 38.)

At block 160, if the command is not an abort MCPU command, the command is decoded to determine if a reset module command has been issued (block 175). If the command is not a reset module command, the processing returns to the wait loop of block 110, since none of the established diagnostic command types have been issued. If a reset module command is issued, the microengine 222 issues a reset module instruction (block 180), and waits a predetermined amount of time (block 185) thereby insuring that the reset command has propagated throughout the module and has been effectuated. At the end of the predetermined time period, the operation returns to the start of the operation and performs the self test (block 101). It is in this manner, namely by the operation of the microengine 222, that the module 16 can interface with a "supervisor" node, and process the special function frame independent of the operation of the module CPU 38.

After a frame is received and addressed to this module, (block 110) and the frame is determined not to be a special function frame (block 115), a determination is made to determine if the frame is a token pass frame (block 282), refer to FIG. 10B. If the frame is a token pass frame a determination is made to determine if a special function frame has been queued up (block 284) to be returned to the transmitting module. If a special function frame has been queued, the special function frame is transmitted (block 286), the special function frame being the watchdog timeout frame or a special function acknowledgment frame. After the special function frame has been transmitted, the token is then passed to the successor module 16 (block 288), and the operation returns to the wait loop of block 110. If no special function frame has been queued (block 284), a determination is made if the off line mode has been entered (block 290). If the off line mode has been entered the operation returns to the wait loop of block 110. If the off line mode has not been entered, information requested from earlier transmissions/commands, are transmitted via an information frame, if such information is available (block 292). The token is then passed to the successor module 16 and the operation returns to the wait loop of block 110.

At block 282, if the frame received is not a token pass frame, a determination is made whether the module is in the off line mode (block 294). (This branch forms the "normal" transmission between modules apart from the token passing.) At this point the frame must be an information frame since no information can be received in an off line mode. If the module is in an off line mode, the operation returns to the wait loop of block 110. If the module is not in an off line mode, the information frame is received and processed, the processing being performed by the module CPU 38. The commands of the information frame are passed to the module CPU 38 from the microengine 222. The results of the processing, if any, are queued for subsequent transmission when the module receives the token and is allowed to transmit on the bus 18 (block 296). The operation the returns to the wait loop of block 110.

While there has been shown what is considered the preferred embodiment of the present invention, it will be manifest that many changes and modifications can be made therein without departing from the essential spirit and scope of the invention. It is intended, therefor, in the annexed claims to cover all such changes and modifications which fall within the true scope of the invention.

We claim:

1. In a local area network having a plurality of nodes (16) wherein the local area network utilizes a token passing scheme for communicating between nodes (16), each node (16) having an interface apparatus (32, 34) which operates independently of a processor (38) associated with said node (16), each node (16) being capable of operating in an on-line mode and an off-line mode, wherein a node (16) in the off-line mode is responsive to a message frame identified as a special function frame, the special function frame containing diagnostic-type commands which are to be performed by the node (16) in the off-line mode, and further wherein the node (16) in the off-line mode does not participate in normal communications of the local area network including the token passing or the receiving of information frames, a method of diagnosing and recovering a second node (16) from a first node (16), the method implemented by the second node (16) comprising the steps of:
   (a) waiting (101, 105, 110) to receive the message frame addressed to the second node (16);
   (b) determining (115) if the message frame is a special function frame, and if the message frame is determined to be the special function frame;
   (c) insuring (120, 125, 135) that the node is in an off-line mode;
   (d) determining (130, 140, 150, 155, 160, 165, 170, 175, 180, 185) the type of special function frame to perform the command specified by the type of special function frame, the function performed being monitored and analyzed by the first node (16) to determine and diagnose fault conditions of the second node (16); and
   (e) returning to the step of waiting of step (a).

2. A method of diagnosing and recovering a second node (16) from a first node (16) according to claim 1, wherein step (d) of claim 1, the step of determining type of special function frame, comprises the steps of:
   (a) determining (140, 150) if the type of special function frame is a read command type wherein the information to be read is specified in the special function frame, and
       (i) if the type of special function frame is a read command type, reading (145, 155) the information specified, and then proceed to step (c), but
       (ii) if the type of special function frame is not a read command type, then doing nothing and proceed to step (b);
   (b) determining (160) if the type of special function frame is an abort command type, and
       (i) if the type of special function frame is an abort command type, issuing (165, 170) a control signal to abort the current processing of the processor (38) associated with the second node (16), and then proceed to step (c), but
       (ii) if the type of special function frame is not an abort command type, then continuing (175, 180, 185) to determine the type of special function frame to perform the function indicated by the type of special function frame and then proceed to step (d);
   (c) queuing (13) an acknowledgment frame message to be subsequently transmitted to said first node (16); and
   (d) returning to the step of waiting, step (a) of claim 1.

3. A method of diagnosing and recovering a second node (16) from a first node (16) according to claim 2, wherein step (b, ii) of claim 2, the step of continuing to determine the type of special function frame, comprises the steps of:
   (a) determining (175) if the type of special function frame is a reset command type, and
       (i) if the type of special function frame is a reset command type, issuing (180) a reset control signal to the second node (16), and then proceed to step (b), but
       (ii) if the type of special function frame is not a reset command type, then doing nothing and proceed to step (c);
   (b) waiting (185) a predetermined amount of time to allow the reset control signal to propagate through the second node (16); and
   (c) returning to the step of waiting to receive a message frame addressed to the second node (16), step (a) of claim 2.

4. A method of diagnosing and recovering a second node (16) from a first node (16) according to claim 1, wherein step (b) of claim 1, the step of determining whether the message frame is a special function frame, is determined to be a frame other than a special function frame, the method further comprising the steps of:
   (a) determining (282) whether the message frame is a token pass frame, and
       (i) if the message frame is determined not to be a token pass frame, performing (294, 296) a normal receive operation of the second node (18), and then proceeding to step (d), but
       (ii) if the message frame is determined to be a token pass frame, do nothing and then proceed to step (b);
   (b) determining (284) if a return special function frame is queued awaiting transmission to the first node (16), and
       (i) if a return special function frame is queued awaiting transmission, transmitting (286) the queued return special function frame, and then proceed to step (c), but
       (ii) if a return special function frame is not queued awaiting transmission, performing (288, 290, 292) normal transmission operation of the second node (16), and then proceed to step (d);
   (c) passing (288) the token to a successor node; and
   (d) returning to the step of waiting to receive a message frame addressed to the second node (18), step (a) of claim 1.

5. A method of diagnosing and recovering a second node (16) from a first node (16) according to claim 2, wherein step (b, i) of claim 2, the step of issuing a control signal to abort the current processing, comprises the steps of:

(a) issuing (165) a high priority, non-inhibitable interrupt to the processor (38) associated with the second node (16), the interrupt causing the processor (38) to suspend operation; and (b) queuing (170) a time out frame message to be subsequently transmitted to said first node (16), when said second node (16) has received the token allowing the second node (16) to transmit.

* * * * *

UNITED STATES PATENT AND TRADEMARK OFFICE
CERTIFICATE OF CORRECTION

PATENT NO. : 4,680,581
DATED : July 14, 1987
INVENTOR(S) : Tony J. Kozlik, Bruce J. Landini It is certified that error appears in the above—identified patent and that said Letters Patent is hereby corrected as shown below:

COL. 1, LINE 26, delete "replay" and insert therefor --reply--

COL. 2, LINE 28, delete "filed" and insert therefor --field--

COL. 3, LINE 53, delete "but" and insert therefor --bit--

COL. 4, LINE 8, delete "units" second occurrence and insert therefor --utilized--

COL. 8, LINE 53, delete "is" and insert therefor --if--

COL. 9, LINE 2, delete "Resent" and insert therefor --Reset--

COL. 11, LINE 9, delete "the" after operation and insert --then--

COL. 11, LINE 45, after "140" insert --145--  (Claim 1)

COL. 12, LINE 12, delete "acknowledgment" and insert therefor --acknowledge--  (Claim 2)

Signed and Sealed this

Nineteenth Day of January, 1988

Attest:

DONALD J. QUIGG

Attesting Officer    Commissioner of Patents and Trademarks